US008738821B2

(12) United States Patent
Klein et al.

(10) Patent No.: US 8,738,821 B2
(45) Date of Patent: May 27, 2014

(54) SELECTING A PATH COMPRISING PORTS ON PRIMARY AND SECONDARY CLUSTERS TO USE TO TRANSMIT DATA AT A PRIMARY VOLUME TO A SECONDARY VOLUME

(75) Inventors: Steven Edward Klein, Tucson, AZ (US); Michael Thomas Benhase, Tucson, AZ (US); James Chien-Chiung Chen, Tucson, AZ (US); Minh-Ngoc Le Huynh, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/283,098

(22) Filed: Nov. 18, 2005

(65) Prior Publication Data

US 2007/0168581 A1 Jul. 19, 2007

(51) Int. Cl.
*G06F 13/00* (2006.01)
*G06F 3/00* (2006.01)

(52) U.S. Cl.
USPC ............................................. 710/31; 710/38

(58) Field of Classification Search
USPC .......................................................... 710/31
See application file for complete search history.

(56) References Cited

U.S. PATENT DOCUMENTS

| 5,168,572 | A | 12/1992 | Perkins |
| 5,459,857 | A * | 10/1995 | Ludlam et al. ................... 714/6 |
| 6,601,128 | B1 | 7/2003 | Burton et al. |
| 2002/0059213 | A1 | 5/2002 | Soga |
| 2002/0143999 | A1 * | 10/2002 | Yamagami ................... 709/249 |
| 2003/0021227 | A1 | 1/2003 | Lee et al. |
| 2003/0023749 | A1 | 1/2003 | Lee et al. |
| 2003/0126197 | A1 | 7/2003 | Black et al. |
| 2003/0187847 | A1 | 10/2003 | Lubbers et al. |
| 2003/0225950 | A1 * | 12/2003 | Paul ................................ 710/38 |

(Continued)

FOREIGN PATENT DOCUMENTS

EP     1 351 143 A2     10/2003

OTHER PUBLICATIONS

"GPFS V2.3 Administration and Programming Reference Asynchronous Mirroring Utilizing ESS FlashCopy", IBM Corporation, Document # SA22-7967-02, pp. 1-4, [online] [retrieved Sep. 29, 2005], http://publib.boulder.ibm.com/infocenter/clresctr/topic/com.ibm.cluster.g . . . .

(Continued)

*Primary Examiner* — Kris Rhu
(74) *Attorney, Agent, or Firm* — Konrad Raynes Davda & Victor LLP; David W. Victor

(57) ABSTRACT

Provided are a method for selecting a path comprising ports on primary and secondary clusters to use to transmit data at a primary volume to a secondary volume. A request is received to copy data from a primary storage location to a secondary storage location. A determination is made from a plurality of primary clusters of an owner primary cluster for the primary storage location, wherein the primary clusters are configured to access the primary storage location. A determination is made as to whether there is at least one port on the owner primary cluster providing an available path to the secondary storage location. One port on the owner primary cluster is selected to use to copy the data to the secondary storage location in response to determining that there is at least one port on the owner primary cluster available to transmit to the secondary storage location.

16 Claims, 7 Drawing Sheets

(56) References Cited

U.S. PATENT DOCUMENTS

| | | |
|---|---|---|
| 2004/0054866 A1* | 3/2004 | Blumenau et al. ............ 711/202 |
| 2004/0103254 A1* | 5/2004 | Satoyama et al. ............ 711/150 |
| 2004/0128363 A1 | 7/2004 | Yamagami et al. |
| 2004/0246971 A1 | 12/2004 | Banerjee et al. |
| 2005/0027737 A1 | 2/2005 | Micka et al. |
| 2005/0097243 A1 | 5/2005 | Yamashita et al. |
| 2005/0188127 A1* | 8/2005 | Anderson et al. ............... 710/38 |

OTHER PUBLICATIONS

"Planning for IBM Remote Copy", IBM Corporation, Document # SG24-2595-00, Dec. 1995, chaps. 1-4, 10 and 15.

PCT International Search Report & Written Opinion dated Jun. 14, 2007 for Serial No. PCT/EP2006/068458, filed Nov. 14, 2006.

"IBM TotalStorage Enterprise Storage Server Model 800, Chapter 3, Architecture", IBM Corp., Document No. XP-002342898, 2002, pp. 49-91.

EPO Communication dated Nov. 5, 2008 for Application No. 06 819 475.2-2416.

PCT Notification Concerning Transmittal of International Preliminary Report on Patentability dated May 29, 2008 for PCT/EP2006/068458.

EPO Amendment dated Mar. 4, 2009 for Application 06819475.2-2416.

* cited by examiner

Secondary Volume Primary Port Info

Secondary Volume Secondary Port Info

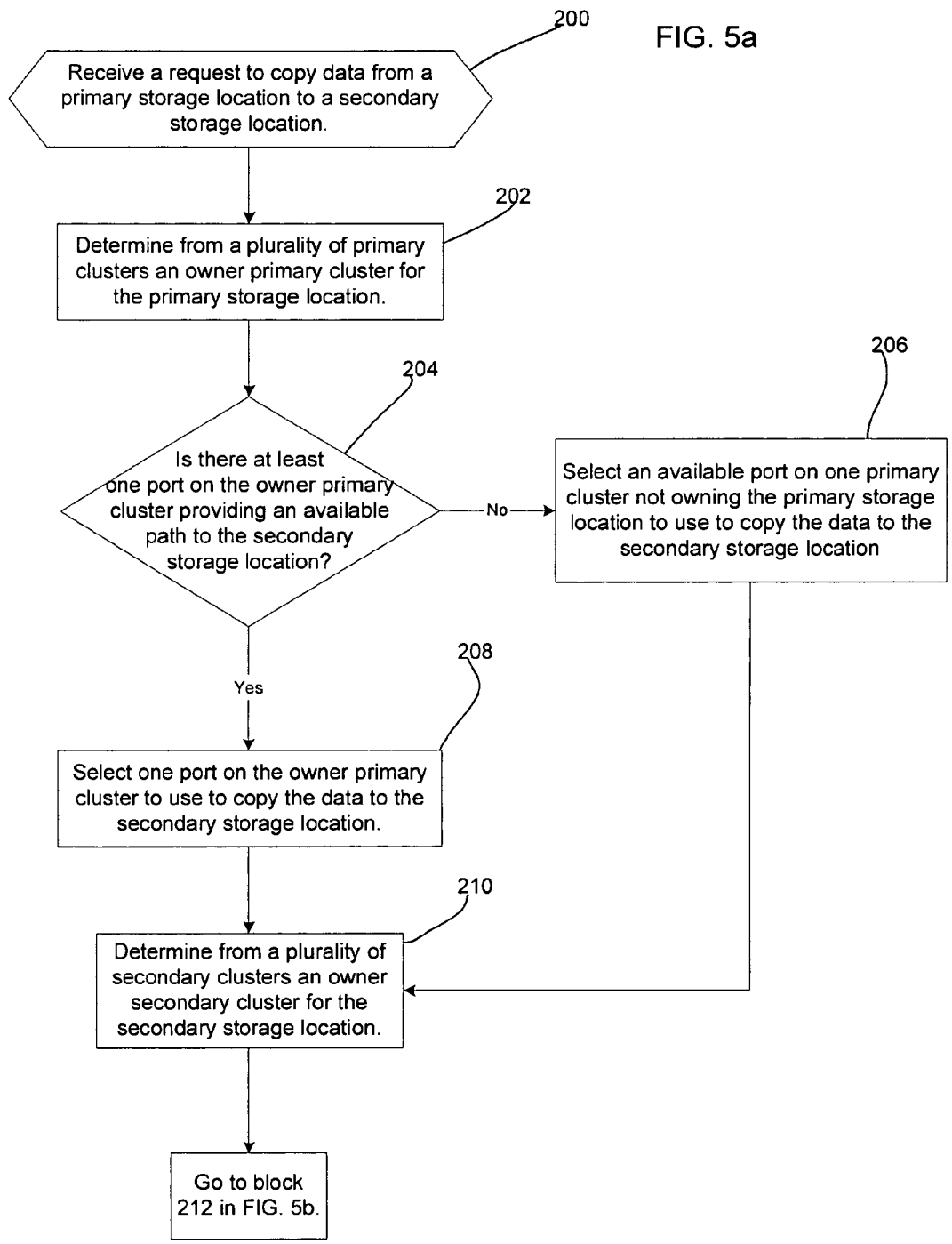

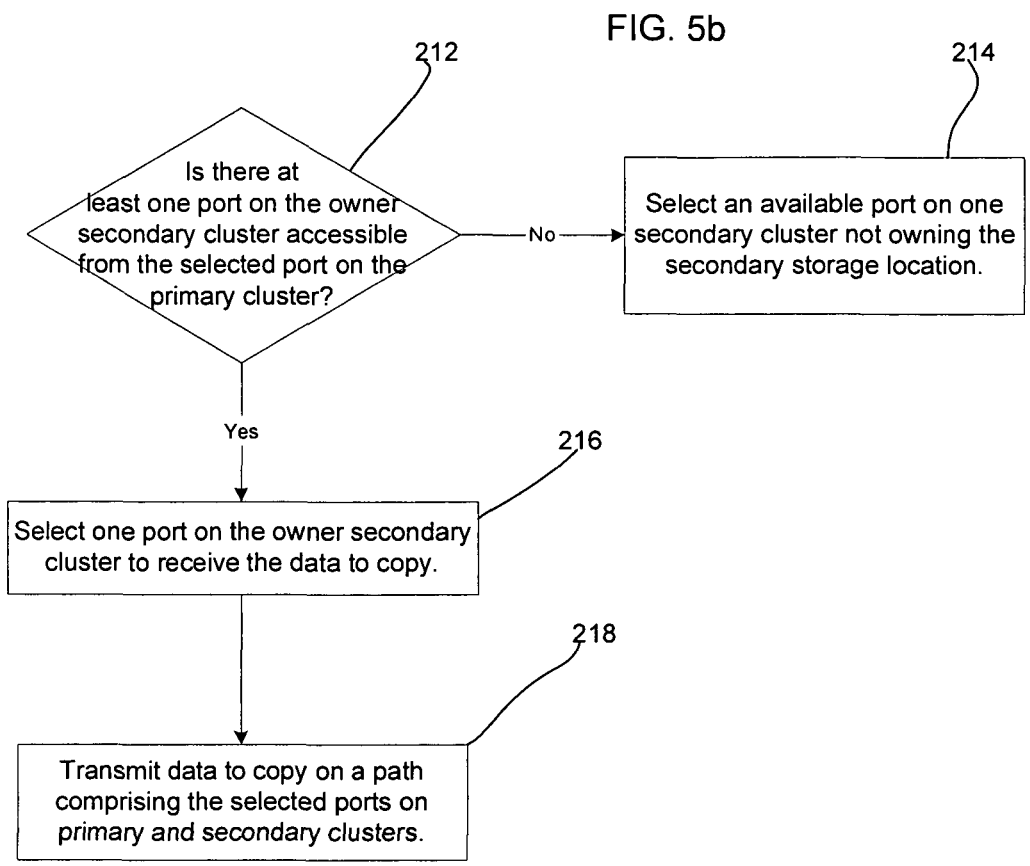

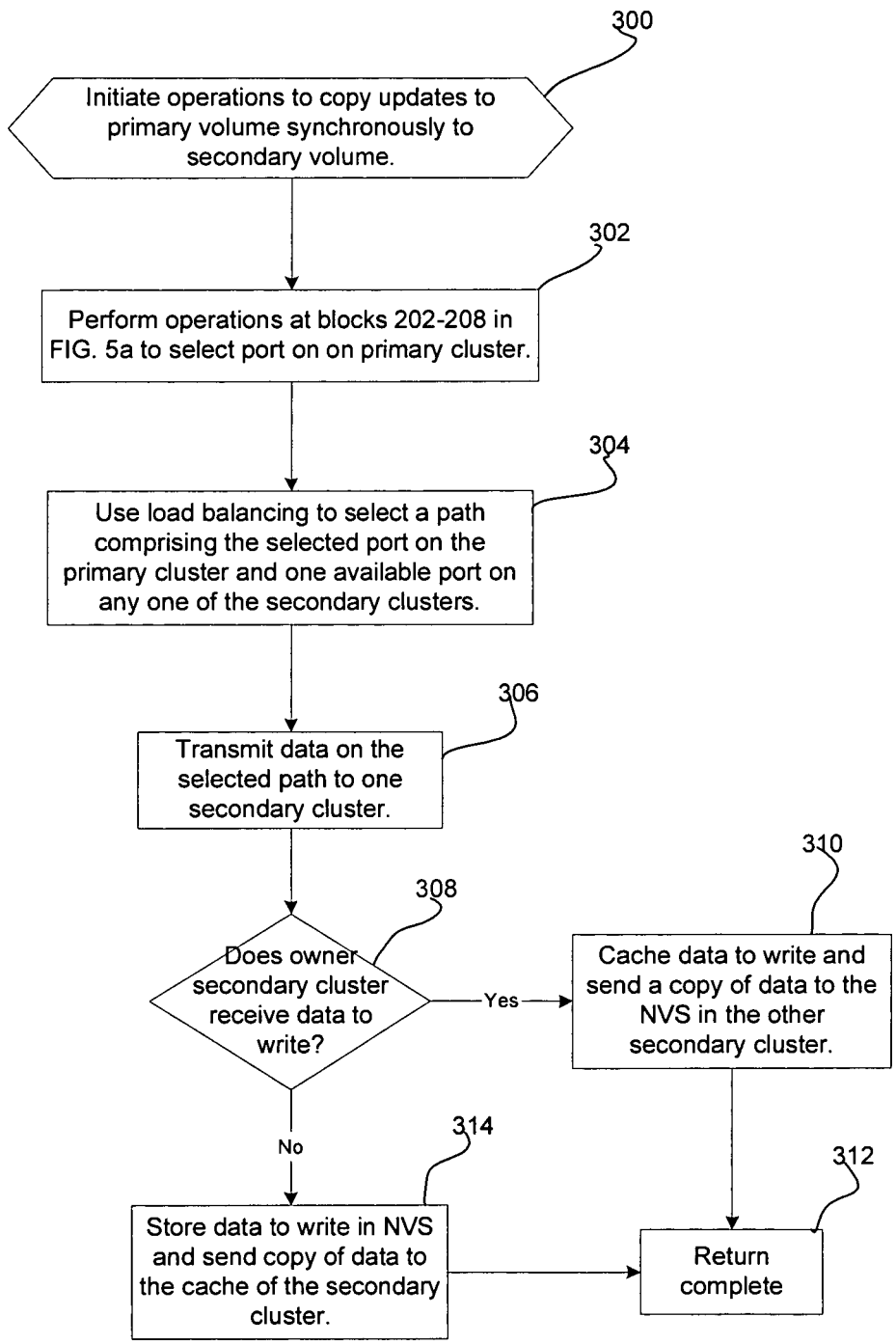

SELECTING A PATH COMPRISING PORTS ON PRIMARY AND SECONDARY CLUSTERS TO USE TO TRANSMIT DATA AT A PRIMARY VOLUME TO A SECONDARY VOLUME

BACKGROUND OF THE INVENTION

1. Field of the Invention

The present invention relates to a method, system, and program for selecting a path comprising ports on primary and secondary clusters to use to transmit data at a primary volume to a secondary volume.

2. Description of the Related Art

Host systems in a storage network may communicate with a storage controller through multiple paths. The storage controller may be comprised of separate storage clusters, where each storage cluster is capable of accessing the storage and provide redundancy to access the storage. If a storage cluster fails, then the host may failover to using the other storage cluster to access the storage.

In certain system architectures, data written to primary volumes in a primary storage system may be mirrored at secondary volumes at a secondary storage system to assist with data recovery and data deployment. Such dual or shadow copies are typically made as the application system is writing new data to a primary storage device. International Business Machines Corporation (IBM) provides Extended Remote Copy (XRC) and Peer-to-Peer Remote Copy (PPRC) solutions for mirroring primary volumes at secondary volumes at separate sites. These systems provide a method for the continuous mirroring of data to a remote site to failover to during a failure at the primary site from which the data is being continuously mirrored. Such data mirroring systems can also provide an additional remote copy for non-recovery purposes, such as local access at a remote site. In such backup systems, data is maintained in volume pairs. A volume pair is comprised of a volume in a primary storage device and a corresponding volume in a secondary storage device that includes an identical copy of the data maintained in the primary volume.

A primary storage controller may maintain copy relationship information on primary and secondary volumes in a volume pair. The primary storage controller may manage the establishment of the initial copy of the primary volume at the secondary volume by transmitting the primary volume data to a secondary storage controller managing access to the secondary volume in the copy relationship. After the initial copy is established, then the primary storage controller transfers updates to the primary volume in the volume pair to the secondary volume.

There may be multiple paths between adapters in the primary storage controller, which may be on different primary clusters (processing complexes), and adapters in the secondary storage controller, which may also have multiple clusters. In certain systems, the primary storage controller may use load balancing to select a path to use to transfer data for a primary volume to the secondary storage controller to write to the secondary volume in the copy relationship.

There is a need in the art for improved techniques for selecting paths to use to transfer data between primary and secondary volumes in a copy relationship.

SUMMARY

Provided are a method, system and program for selecting a path comprising ports on primary and secondary clusters to use to transmit data at a primary volume to a secondary volume. A request is received to copy data from a primary storage location to a secondary storage location. A determination is made from a plurality of primary clusters of an owner primary cluster for the primary storage location, wherein the primary clusters are configured to access the primary storage location. A determination is made as to whether there is at least one port on the owner primary cluster providing an available path to the secondary storage location. One port on the owner primary cluster is selected to use to copy the data to the secondary storage location in response to determining that there is at least one port on the owner primary cluster available to transmit to the secondary storage location.

BRIEF DESCRIPTION OF THE DRAWINGS

FIGS. 5a, 5b, 6, and 7 illustrate embodiments of operations to select ports on primary and secondary clusters to use to transfer data between a primary and secondary volumes.

DETAILED DESCRIPTION

Figure 1:
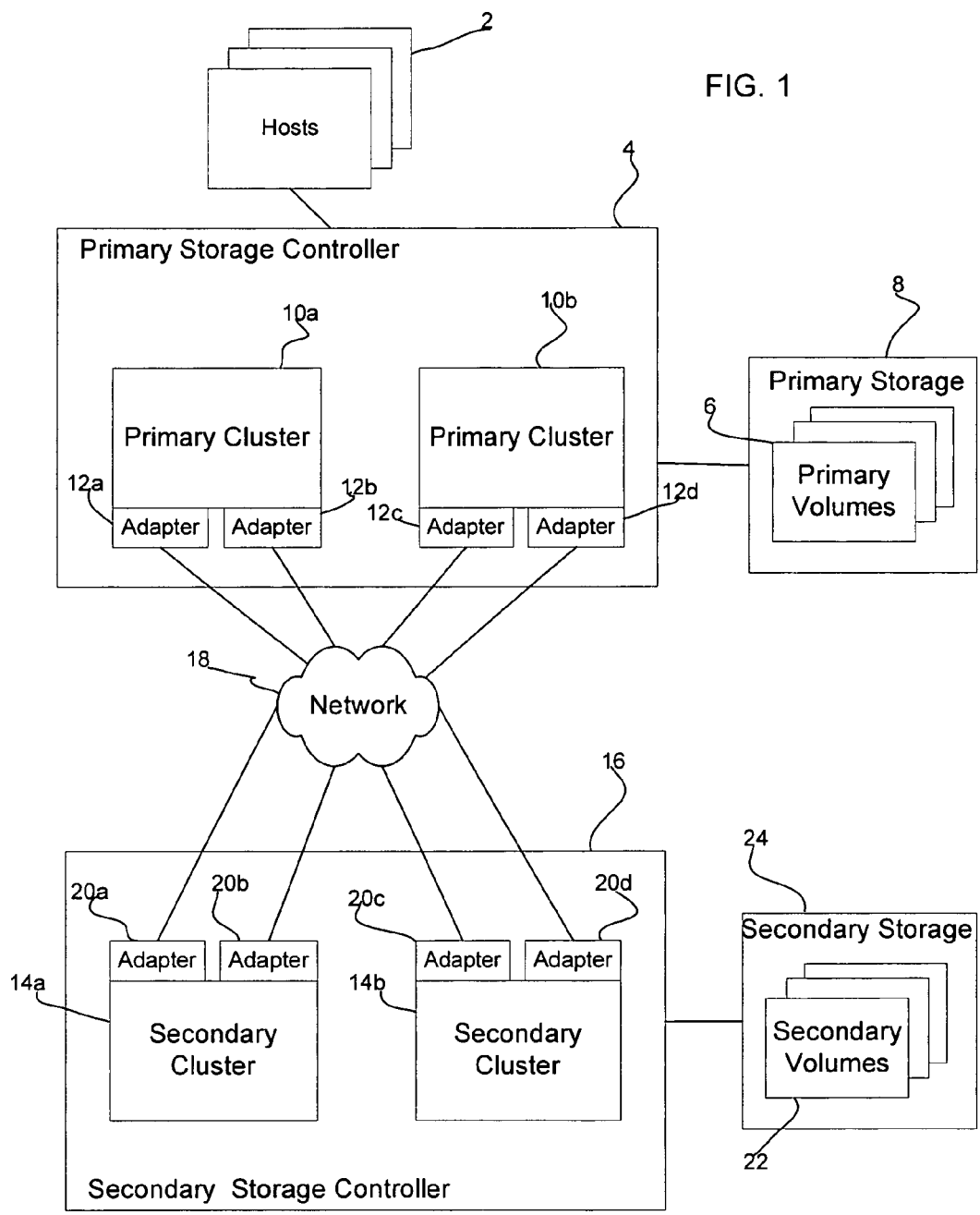
FIG. 1 illustrates an embodiment of a network computing environment.

FIG. 1 illustrates an embodiment of a network computing environment. A plurality of hosts 2 may submit Input/Output (I/O) requests to a primary storage controller 4 to access data at primary volumes 6 (e.g., Logical Unit Numbers, Logical Devices, etc.) in a primary storage 8. The primary storage controller 4 includes two or more primary clusters 10a, 10b (two are shown). Host I/O requests may be submitted to either cluster 10a, 10b to write to the primary storage 8.

Each primary cluster 10a, 10b includes one or more network adapters 12a, 12b, 12c, 12d (two are shown in each cluster 10a, 10b) to provide communication with two or more secondary clusters 14a, 14b in a secondary storage controller 16 over a network 18. Each secondary cluster 14a, 14b has one or more network adapters 20a, 20b, 20c, 20d (two are shown in each cluster 14a, 14b) to enable communication with the primary clusters 10a, 10b over the network 18. The secondary clusters 14a, 14b manage access to volumes 22 in a secondary storage 24

The storage controllers 4, 16 may comprise storage controllers or servers known in the art, such as the International Business Machines (IBM) Enterprise Storage Server (ESS)® (Enterprise Storage Server is a registered trademark of IBM). Alternatively, the storage controllers may comprise a lower-end storage server as opposed to a high-end enterprise storage server. The clusters in each storage controller comprise separate processing systems, and may be on different power boundaries and implemented in separate hardware components, such as each cluster implemented on a separate motherboard. The hosts 2 may comprise computing devices known in the art, such as a server, mainframe, workstation, personal computer, hand held computer, laptop, telephony device, network appliance, etc., that are capable of communicating I/O requests to the primary storage controller 4 to access the primary storage 8. The hosts 2 may connect over the network 18 or some other connection to the primary storage controller 4. The network 18 may comprise a Storage Area Network (SAN), Local Area Network (LAN), Intranet, the Internet, Wide Area Network (WAN), peer-to-peer network, etc. The primary 8 and secondary 24 storages 8b may comprise an array of storage devices, such as a Just a Bunch of Disks (JBOD), Direct Access Storage Device (DASD), Redundant Array of Independent Disks (RAID) array, virtualization device, tape storage, flash memory, etc.

Figure 2:
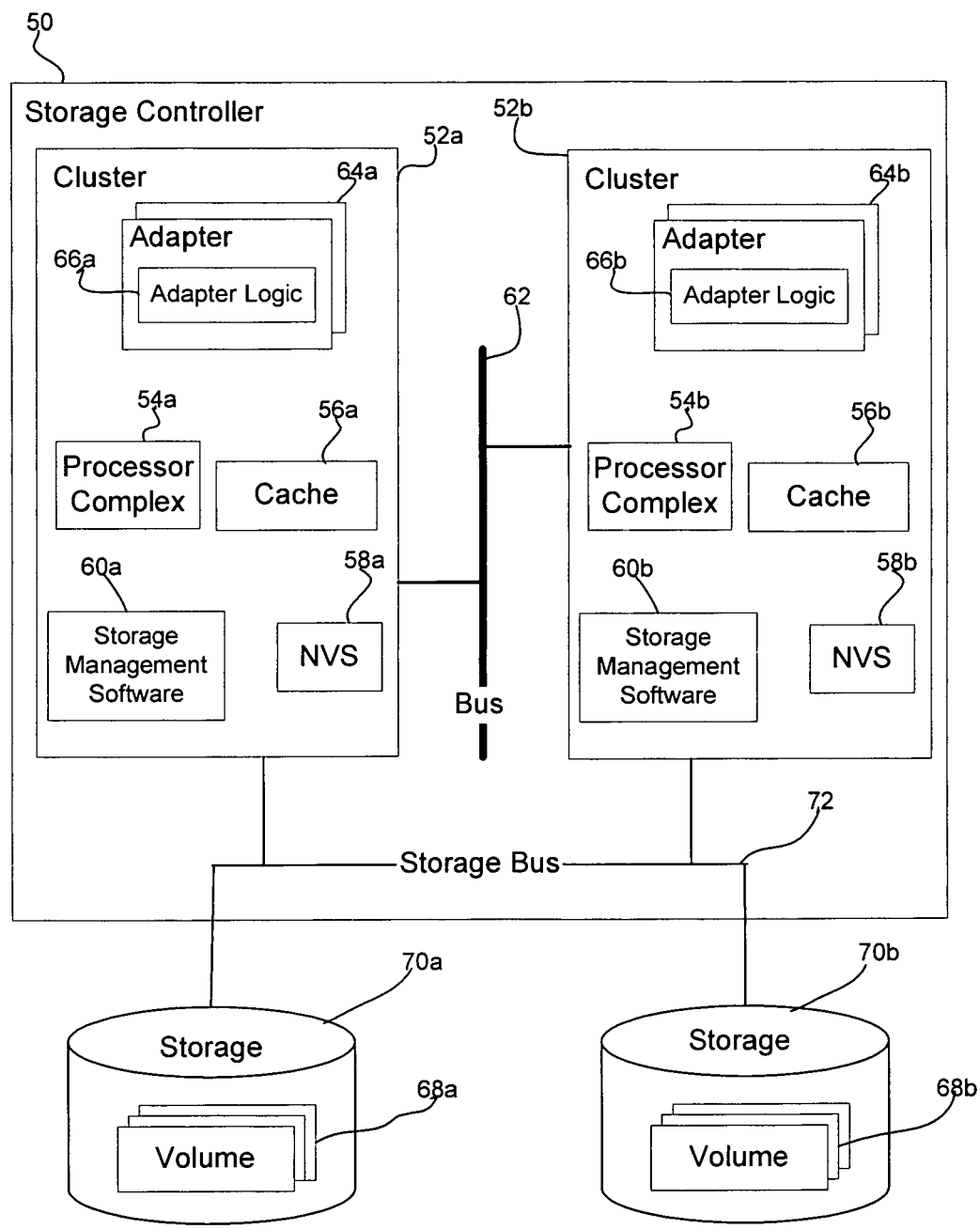
FIG. 2 illustrates an embodiment of a storage controller.

FIG. 2 illustrates an embodiment of components within a storage controller 50, such as the primary 4 and secondary 16 storage controllers shown in FIG. 1. The storage controller 50 includes two clusters 52a, 52b, such as clusters 10a, 10b, 14a, 14b. Each cluster 52a, 52b includes a processor complex 54a, 54b, a cache 56a, 56b, and a non-volatile storage unit (NVS) 58a, 58b to backup data in the cache 56a, 56b for certain types of write operations. The clusters 52a, 52b receive I/O requests from the hosts 2 and buffer the requests and write data in their respective cache 56a, 56b to an attached storage. Each cluster 12a, 12b includes storage management software 60a, 60b executed by the processor complexes 546a, 54b to manage I/O requests.

The storage management software 60a, 60b may maintain information on copy relationships between primary volumes 6 in the primary storage 8 and secondary volumes 22 in the secondary storage 24, i.e., volume pairs, such that any updates to a primary volume 6 in a relationship is copied over to the corresponding secondary volume 22 in the relationship so that the secondary volume 22 in the relationship maintains a mirror copy of the associated primary volume 6. During an initial copy phase, data in the primary volume 6 in the relationship is copied to the secondary volume 8 asynchronously. For instance, a virtual point-in-time copy may be made of the primary volume 6, and then the data indicated in the virtual copy, such as the IBM FlashCopy® operation, is asynchronously copied from the primary volume 6 to the secondary volume. (FlashCopy is a registered trademark of IBM) After the initial copy phase, updates to the primary volume 6 may be copied to the secondary volume 22 synchronously, such that complete is returned for an update when the write data is in the cache of the secondary cluster 14a, 14b that owns the secondary volume in the relationship and a copy of the write data is in the NVS of the non-owning cluster 14a, 14b.

A bus 62 provides a communication interface to enable communication between the clusters 52a, 52b. The bus may comprise any communication interface known in the art, such as Peripheral Component Interconnect (PCI) bus, or other bus interfaces, or a network communication interface, such as a Wide Area Network (WAN), Storage Area Network (SAN), Local Area Network (LAN), the Internet, a wireless network, etc. Each cluster 52a, 52b further includes one or more adapters 64a, 64b to enable communication on the network 18 and to provide connections to adapters of clusters in another storage controller. The adapters 64a, 64b dedicated to a particular cluster 52a, 52b may be located on-board the cluster's motherboard or in an expansion card inserted in an expansion card slot on the motherboard of the cluster 52a, 52b. Alternatively, the adapters may be shared by the clusters. Each adapter 64a, 64b includes adapter logic 66a, 66b to manage the network communication. Each adapter 64a, 64b may include one or more physical ports to provide separate connections in the network 18.

The clusters 52a, 52b are both capable of accessing volumes 68a, 68b in storage systems 70a, 70b over a shared storage bus 72, which may utilize a suitable storage communication interface known in the art. The storage management software 60a, 60b may also maintain an assignment of clusters 52a, 52b to be the owner of particular volumes 68a, 68b in the attached storages 70a, 70b, such that an owner cluster 52a, 52b handles the writes to those volumes 68a, 68b that cluster owns by caching the write data and executing the write against the volume.

Figure 3:
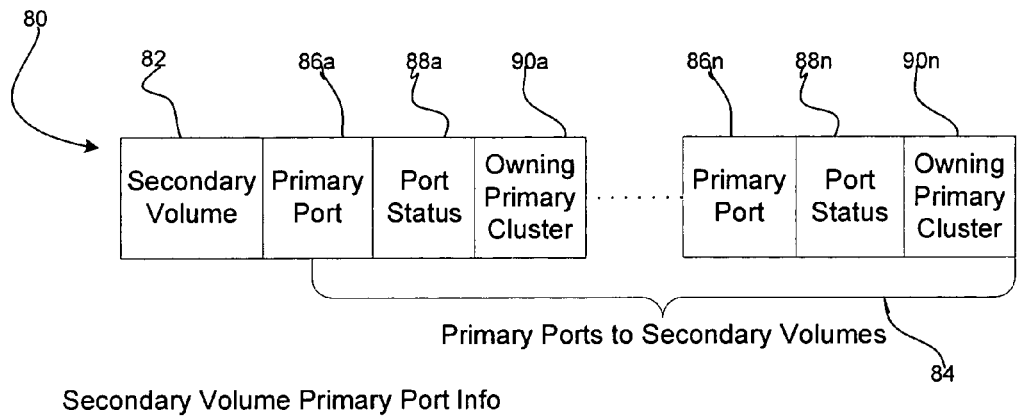
FIGS. 3 and 4 illustrate an embodiment of port information used to select primary and secondary ports to use to transmit data.

FIG. 3 illustrates an embodiment of secondary volume primary port information 80 providing information on primary ports on the primary cluster adapters 12a, 12b that may be used to communicate with the secondary clusters 14a, 14b to access an identified secondary volume 22. The information 80 includes a secondary volume identifier (ID) 82 and a list 84 of information on primary ports that may be used to access the identified secondary volume. Each entry in this list 84 may include a primary port ID 86a . . . 86n, a status 88a . . . 88n of the primary port (active or disabled); and the primary cluster 90a . . . 90n on which the primary port 86a . . . 86n is located, i.e., the primary cluster 90a . . . 90n having the adapter including the identified port. This information may be maintained for each primary volume 6 in a copy relationship with a secondary volume 22, i.e., volume pair.

Figure 4:
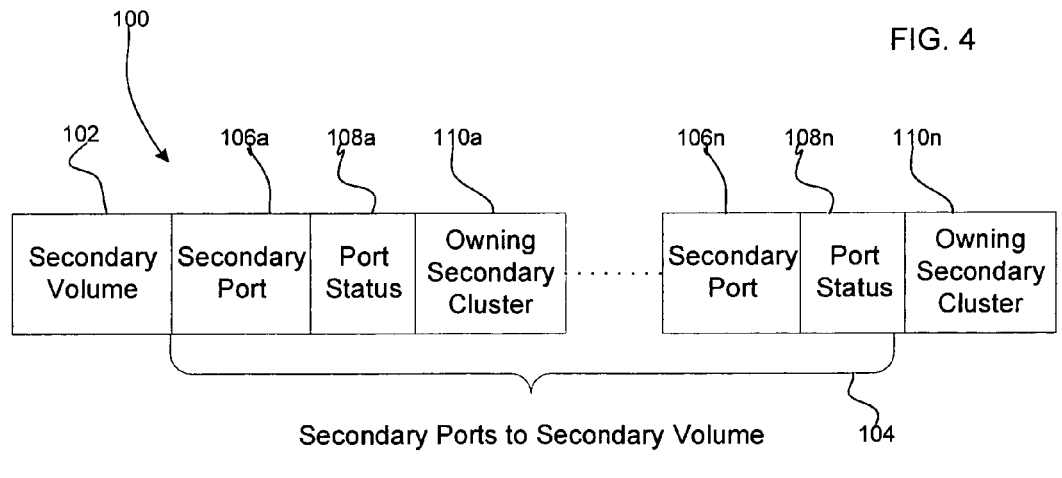

FIG. 4 illustrates an embodiment of secondary volume secondary port information 100 providing information on secondary ports on the secondary cluster adapters 20a, 20b, 20c, 20d that may be used to communicate with the secondary clusters 14a, 14b to access a secondary volume 22. The information 100 includes a secondary volume identifier (ID) 102 and a list 104 of information on secondary ports in the secondary adapters 20a, 20b, 20c, 20d that may be used to access the identified secondary volume. Each entry in this list 104 may include a secondary port ID 106a . . . 106n, a status 108a . . . 108n of the secondary port; and an owner secondary cluster 110a . . . 100n on which the secondary port 106a . . . 106n is located, i.e., the secondary cluster having the adapter including the identified port. This information may be maintained for each volume pair.

FIGS. 5a and 5b illustrate operations performed by components in the primary clusters 10a, 10b to copy data, as part of an initial copy or subsequent synchronization, from a primary volume 6 to a secondary volume 22 in a copy relationship. The operations may be performed by the storage management software 60a, 60b in the primary clusters or performed by both the storage management software 60a, 60b and adapter logic 66a, 66b. In response to processing (at block 200) a request to copy data from a primary storage location (volume) 6 to a secondary storage location (volume) 22, the storage management software 60a, 60b processing the request determines (at block 202) from a plurality of primary clusters 10a, 10b an owner primary cluster for the primary storage location 6. The owner primary cluster 10a, 10b may be determined by processing the identifier number for the primary volume 6 because the number may map to or be derived from the owner primary cluster 10a, 10b. Alternatively, the storage management software 60a, 60b may maintain a table associating primary volumes 6 with their owner primary clusters 10a, 10b. A determination is then made (at block 204) as to whether there is at least one port on the owner primary cluster adapter 12a, 12b, 12c, 12d providing an available path to the secondary volume. The storage management software 60a, 60b may process the entry 80 (FIG. 3) for the secondary volume to receive the data to determine whether there is one primary port 86a . . . 86n whose owning primary cluster 90a . . . 90b is the determined owner primary cluster 10a, 10b of the primary volume 6 subject to the copy operation, and whether one of the determined primary ports 86a . . . 86n has an active or available port status 88a . . . 88n indicating that the connection to the secondary storage controller 16 is operational.

If (at block 204) there is no primary port on an adapter 12a, 12b, 12c, 12d of the primary cluster 10a, 10b owning the primary volume 6 having the data to copy, then the storage management software 60a, 60b selects (at block 206) an available port on one primary cluster not owning the primary volume 6 to use to copy the data to the secondary storage location. The storage management software 60a, 60b may use a load balancing algorithm or other selection technique to select an available port if there are multiple ports available. Otherwise, if (at block 204) there are available primary ports, then one available port is selected (at block 208) on the owner primary cluster 10a, 10b to use to copy the data to the secondary storage volume 22.

The operations at blocks 210-218 may be performed by the storage management software 60a, 60b or by the adapter logic 66a, 66b. If the operations are performed by the adapter logic 66a, 66b, then the copy request is forwarded to the selected port and the adapter logic 66a, 66b in the adapter 64a, 64b including the selected port performs the operations at blocks 210-218 to select a port on the secondary cluster and path on which to transmit the data to copy to the secondary volume 22.

At block 210, a determination is made from a plurality of secondary clusters of an owner secondary cluster 14a, 14b for the secondary volume 22 to receive the data. The owner secondary cluster 14a, 14b may be determined by processing the identifier number for the secondary volume 22 because the number may map to the owner secondary cluster 14a, 14b. Alternatively, the storage management software 60a, 60b or adapter logic 66a, 66b may maintain a table associating secondary volumes 22 with their owner secondary clusters 14a, 14b. A determination is then made (at block 212) as to whether there is at least one port on the determined owner secondary cluster adapter 20a, 20b, 20c, 20d providing an available path to the secondary volume 22. The storage management software 60a, 60b or adapter logic 66a, 66b may process the entry 100 (FIG. 4) for the secondary volume to receive the data to determine whether there is one secondary port 106a . . . 106n whose owning primary cluster 110a . . . 110b is the determined owner secondary cluster 14a, 14b of the secondary volume 22 to receive data, and whether one of the determined secondary ports 106a . . . 106n has an active or available port status 108a . . . 108n indicating that the connection to the secondary port is operational.

If (at block 212) there is no secondary port on an adapter 20a, 20b, 20c, 20d of the secondary cluster 14a, 14b owning the secondary volume 22 to receive the data, then an available port is selected (at block 214) on one secondary cluster 14a, 14b not owning the secondary volume 22 to use to copy the data to the secondary volume 22. Otherwise, if (at block 212) there are available secondary ports, then one available secondary port is selected (at block 216) on the owner secondary cluster 14a, 14b to receive the data to write to the secondary storage volume 22. If there are multiple available ports, then a load balancing algorithm may be used to select an available port. Other selection techniques may be used to select an available port, e.g., round robin, etc. The data to copy is then transmitted (at block 218) on a path comprising the selected ports on the adapters in the primary and secondary clusters.

With the described operations of FIGS. 5a and 5b, the selection criteria prefers to select ports on adapters on the primary and secondary clusters owning the primary and secondary volumes, respectively, subject to the copy operation. If there are multiple available ports on the primary and secondary clusters that own the primary and secondary volumes, then load balancing may be used to select a path having ports on the primary and secondary clusters owning the primary and secondary volumes, respectively.

In one embodiment, the storage management software 60a, 60b may perform the operations at blocks 200-208 and then forward the copy request to the adapter 12a, 12b, 12c, 12d including the selected port. The adapter logic 66a, 66b on the adapter card receiving the copy request may then perform the operations at blocks 210-218 to select a secondary port on one secondary cluster 14a, 14b to use and then transmit the data for the secondary volume 22 on the path comprising the selected primary and secondary ports.

Figure 6:
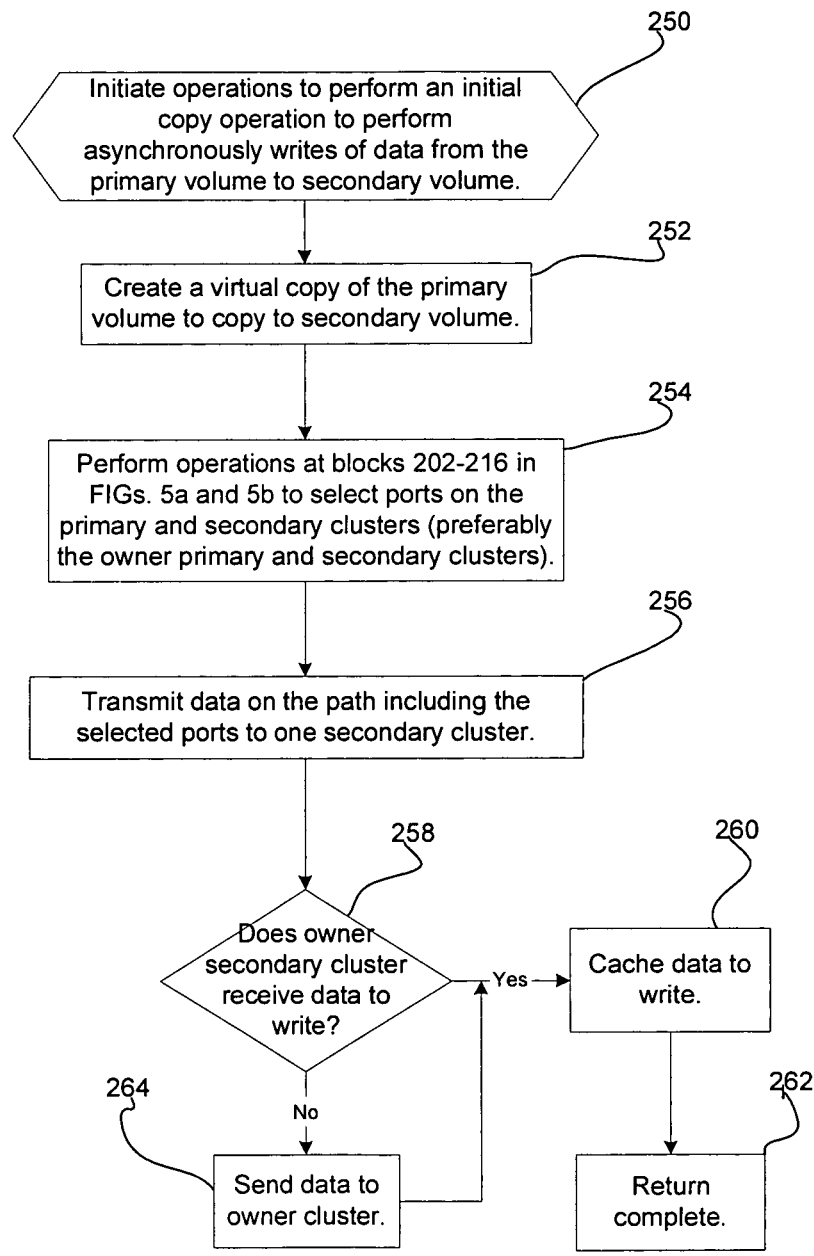

FIG. 6 illustrates an embodiment of operations performed by the storage management software 60a, 60b alone or in combination with the adapter logic 66a, 66b to transfer data from the primary volume 6 to a secondary volume 22 in a copy relationship to establish the initial mirror copy. Upon initiating (at block 250) operations to perform the initial copy operation to asynchronously transfer data from the primary volume 6 to the secondary volume 22 in the copy relationship, the storage management software 60a, 60b creates (at block 252) a virtual copy, such as an IBM FlashCopy®, of the primary volume to copy to a secondary volume. The virtual copy may comprise a bitmap having bits for each track in the primary volume to copy and other management information. The tracks indicated in the bitmap are then asynchronously copied to the secondary volume in the volume pair and the bit is set when the track is copied over. The storage management software 60a, 60b and maybe also the adapter logic 66a, 66b perform (at block 254) the operations at blocks 202-216 in FIGS. 5a and 5b to select ports on the primary and secondary clusters (preferably the owner primary and secondary clusters). The adapter having the selected primary port then transmits (at block 256) the data on the path including the selected ports to one secondary cluster 14a, 14b (preferably the owner secondary cluster).

Blocks 258-262 illustrate operations performed by the storage management software 60a, 60b in the secondary clusters 14a, 14b receiving the data to write. If (at block 258) the owner secondary cluster 14a, 14b received the data to write (where the owner secondary cluster may be determined from the target secondary volume), then the owner secondary cluster 14a, 14b caches (at block 260) the received data and returns (at block 262) complete. At some later point, the data is flushed from cache 56a, 56b (FIG. 2) to the secondary volume 22. Otherwise, (if at block 258) the non-owner secondary cluster received the data to write, then the non-owner cluster sends (at block 264) the data to the owner secondary cluster 14a, 14b and control proceeds to block 260 where the owner secondary cluster caches the data. The operations of FIG. 6 comprise an asynchronous copy in that complete is returned for the write operation when the data is cached. Complete would be returned for the initial copy after all the data in the primary volume 6 being mirrored copied to the secondary storage controller 16 is flushed from cache to the secondary storage 24.

FIG. 7 illustrates an embodiment of operations to copy updates to the primary volume 6 in a copy relationship after the initial copy is established. Upon initiating (at block 300) operations to copy updates to the primary volume 6 synchronously to a secondary volume 22 in a copy relationship, the storage management software 60a, 60b performs (at block 302) the operations at blocks 202-208 in FIG. 5a to select a primary port on the primary cluster (preferably the owner primary cluster of the primary volume). The storage management software 60a, 60b (or the adapter logic 66a, 66b) may then use load balancing to select (at block 304) a path comprising the selected port on the primary cluster and one available port on any one of the secondary clusters. In an alternative embodiment, the operations at blocks 210-216 in FIGS. 5a and 5b may be used to select the secondary port in the path. The primary adapter 12a, 12b, 12c, 12d having the selected primary port transmits (at block 306) the data on the selected path to one secondary cluster 14a, 14b.

Blocks 308-312 illustrate an embodiment of operations performed by the storage management software 60a, 60b in the secondary cluster 14a,14b receiving the data to write. If (at block 308) the owner secondary cluster 14a, 14b receives the data to write (where the owner secondary cluster may be determined from the target secondary volume number), then the owner secondary cluster 14a, 14b caches (at block 310) the received data in its cache 56a, 56b and sends a copy of the data to the NVS 58a, 85b in the other secondary cluster. Complete is then returned (at block 312) after the copy is stored in the NVS 58a, 58b. At some later point, the data is flushed from cache 56a, 56b (FIG. 2) to the secondary volume 22. Otherwise, if (at block 308) the non-owner secondary cluster received the data to write, then the non-owner cluster stores (at block 314) the data to write in NVS 58a, 58b and sends a copy of the data to the owner secondary cluster to store in the owner cache 56a, 56b.

Described embodiments provide techniques to select ports on adapters of clusters to use to transmit data for a primary volume to a secondary volume in a copy relationship to improve the copy performance. In certain embodiments, ports are selected preferably on primary and secondary clusters that own the primary and secondary volumes, respectively, involved in the copy operation in order to avoid having to perform the extra operation of transferring data from a non-owner cluster to the cluster owning the volume.

Additional Embodiment Details

The described operations may be implemented as a method, apparatus or article of manufacture using standard programming and/or engineering techniques to produce software, firmware, hardware, or any combination thereof. The described operations may be implemented as code maintained in a "computer readable medium", where a processor may read and execute the code from the computer readable medium. A computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices. An "article of manufacture" comprises computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the present invention, and that the article of manufacture may comprise suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

FIGS. 3 and 4 provide an embodiment of information maintained on primary and secondary ports to enable selection of a path having ports on the primary and secondary clusters owning the primary and secondary volumes in the copy relationship. In alternative embodiments, the information may be maintained in different types of data structures along with additional or different information used to select paths for I/O operations.

The illustrated operations of FIGS. 5a, 5b 6, and 7 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
receiving a copy request to copy data from a primary storage location to a secondary storage location;
determining, by storage management software executing in one of a plurality of primary clusters in a primary storage controller, wherein each primary cluster includes a plurality of primary network adaptors, an owner primary cluster of the primary clusters for the primary storage location, wherein the primary network adaptors in the primary clusters are configured to access the primary storage location, wherein the primary clusters designated as an owner of a storage location handle writes to the storage location;
determining, by the storage management software, whether there is at least one port on one of the primary network adaptors in the owner primary cluster providing an available path to the secondary storage location, wherein one path is available when the path is operational;
selecting, by the storage management software, one port on one of the primary network adaptors in the owner primary cluster to use to copy the data to the secondary storage location in response to determining that there is at least one port on one of the primary network adaptors in the owner primary cluster available to transmit to the secondary storage location;
selecting, by the storage management software, an available port on one of the primary network adaptors in the primary cluster not owning the primary storage location to use to copy the data to the secondary storage location in response to determining that there is not at least one port on one of the primary network adaptors in the owner primary cluster available to transmit to the secondary storage location;
determining, by adaptor logic in the primary network adaptor including the selected available port, from a plurality of secondary clusters in a secondary storage controller, wherein each secondary cluster includes a plurality of secondary network adaptors, an owner secondary cluster for the secondary storage location, wherein the secondary network adaptors in the secondary clusters are configured to access the secondary storage location;
determining, by the adaptor logic, whether there is at least one port on one of the secondary network adaptors in the owner secondary cluster available through the selected port on one of the primary network adaptors in the owner primary cluster; and
selecting, by the adaptor logic, one port on one of the secondary network adaptors in the owner secondary cluster to use to copy the data in response to determining that there is at least one port on one of the secondary network adaptors in the owner secondary cluster available to transmit to the secondary storage location.

2. The method of claim 1, wherein during an initial copy phase data at the primary storage location is copied to the secondary storage location, wherein a synchronization phase follows the initial copy phase during which updates to the primary storage location are copied to the secondary storage location, wherein during the synchronization copy phase the operations of determining the owner secondary cluster and selecting one port on the owner secondary cluster are not performed, further comprising:
selecting, by the adaptor logic, during the synchronization copy phase, one port on one of the secondary clusters to use to copy data to the secondary storage location.

3. The method of claim 1, further comprising:
selecting, by the adaptor logic, a path comprising the selected port on the owner primary cluster and one active port on one of the secondary clusters in response to determining that there is not at least one active port on the owner secondary cluster.

4. The method of claim 1, further comprising:
selecting, by the adaptor logic, a path comprising one active port on one of the primary clusters and the selected port on the owner secondary cluster in response to determining that there is not at least one active port on the owner primary cluster.

5. The method of claim 1, further comprising:
selecting an available port on one primary cluster not owning the primary storage location and one port on one second cluster not owning the secondary storage location to use to copy the data to the secondary storage location in response to determining that there is not at least one active port on the owner primary cluster and the owner secondary cluster available to transmit to the secondary storage location.

6. The method of claim 2, wherein during the initial copy phase, the owning secondary cluster caches the data to copy to the secondary storage location and a copy of the data is not provided to another secondary cluster.

7. The method of claim 2, wherein during the synchronization phase, the operations of determining the owner secondary cluster and selecting one port on the owner secondary cluster are not performed and wherein during the synchronization phase the owner secondary cluster caches the data to copy to the secondary storage location and one other secondary cluster stores a copy of the data to copy to the secondary storage location.

8. The method of claim 1, further comprising:
forwarding, by the storage management software, the copy request and indication of the selected port on one of the primary clusters to the adaptor logic in the primary network adaptor including the selected port;
receiving, by the adaptor logic, the copy request and the indication of the selected port on the owner primary cluster; and
transmitting, by the adaptor logic, the data for the copy request on a path comprising the selected ports on the primary and secondary clusters including the selected ports.

9. An article of manufacture comprising at least one computer readable storage medium having code, including storage management software and adaptor logic in network adaptors, executed to copy data from a primary storage location to a secondary storage location and to perform operations, the operations comprising:
receiving a copy request to copy data from a primary storage location to a secondary storage location;
determining, by the storage management software executing in one of a plurality of primary clusters in a primary storage controller, wherein each primary cluster includes a plurality of primary network adaptors, an owner primary cluster of the primary clusters for the primary storage location, wherein the primary network adaptors in the primary clusters are configured to access the primary storage location, wherein the primary clusters designated as an owner of a storage location handle writes to the storage location;

determining, by the storage management software, whether there is at least one port on one of the primary network adaptors in the owner primary cluster providing an available path to the secondary storage location, wherein one path is available when the path is operational;

selecting, by the storage management software, one port on one of the primary network adaptors in the owner primary cluster to use to copy the data to the secondary storage location in response to determining that there is at least one port on one of the primary network adaptors in the owner primary cluster available to transmit to the secondary storage location;

selecting, by the storage management software, an available port on one of the primary network adaptors in the primary cluster not owning the primary storage location to use to copy the data to the secondary storage location in response to determining that there is not at least one port on one of the primary network adaptors in the owner primary cluster available to transmit to the secondary storage location;

determining, b the adaptor logic in the primary network adaptor including the selected available port, from a plurality of secondary clusters in a secondary storage controller, wherein each secondary cluster includes a plurality of secondary network adaptors, an owner secondary cluster of the secondary clusters for the secondary storage location, wherein the secondary network adaptors in the secondary clusters are configured to access the secondary storage location;

determining, by the adaptor logic, whether there is at least one port on one of the secondary network adaptors in the owner secondary cluster available through the selected port on one of the primary network adaptors in the owner primary cluster; and selecting, by the adaptor logic, one port on one of the secondary network adaptors in the owner secondary cluster to use to copy the data in response to determining that there is at least one port on one of the secondary network adaptors in the owner secondary cluster available to transmit to the secondary storage location.

10. The article of manufacture of claim 9, wherein the operations further comprise:
selecting, by the adaptor logic, a path comprising the selected port on the owner primary cluster and one active port on one of the secondary clusters in response to determining that there is not at least one active port on the owner secondary cluster.

11. The article of manufacture of claim 9, wherein the operations further comprise:
selecting, by the adaptor logic, a path comprising one active port on one of the primary clusters and the selected port on the owner secondary cluster in response to determining that there is not at least one active port on the owner primary cluster.

12. The article of manufacture of claim 9, wherein the operations further comprise:
forwarding, by the storage management software, the copy request and indication of the selected port on one of the primary clusters to the adaptor logic in the primary network adaptor including the selected port;

receiving, by the adaptor logic, the copy request and the indication of the selected port on the owner primary cluster; and transmitting, by the adaptor logic, the data for the copy request on a path comprising the selected ports on the primary and secondary clusters including the selected ports.

13. A system in communication with a primary storage location and a plurality of secondary clusters in a secondary controller, wherein each secondary cluster includes a plurality of secondary adaptors, configured to access a secondary storage location, comprising:

a primary storage controller including a plurality of primary clusters, wherein each primary cluster includes a plurality of primary network adaptors including at least one port providing a path to the secondary storage location; and storage management software that when executed within one of the primary clusters to performs operations comprising:
receiving a copy request to copy data from a primary storage location to a secondary storage location;

determining from the plurality of primary clusters an owner primary cluster for the primary storage location, wherein the primary network adaptors in the primary clusters are configured to access the primary storage location, wherein the primary clusters designated as an owner of a storage location handle writes to the storage location;

determining whether there is at least one port on one of the primary network adaptors in the owner primary cluster providing an available path to the secondary storage location, wherein one path is available when the path is operational;

selecting one port on one of the primary network adaptors in the owner primary cluster to use to copy the data to the secondary storage location in response to determining that there is at least one port on one of the primary network adaptors in the owner primary cluster available to transmit to the secondary storage location; and selecting an available port on one of the primary network adaptors in the primary cluster not owning the primary storage location to use to copy the data to the secondary storage location in response to determining that there is not at least one port on one of the primary network adaptors in the owner primary cluster available to transmit to the secondary storage location;

adaptor logic in the primary network adaptor including the selected available port that when executed performs:
determining from the plurality of secondary clusters in the secondary storage controller an owner secondary cluster for the secondary storage location, wherein the secondary network adaptors in the secondary clusters are configured to access the secondary storage location;

determining whether there is at least one port on one of the secondary adaptors in the owner secondary cluster available through the selected port on one of the primary network adaptors in the owner primary cluster; and selecting, by the adaptor logic, one port on one of the secondary network adaptors in the owner secondary cluster to use to copy the data in response to determining that there is at least one port on one of the secondary network adaptors in the owner secondary cluster available to transmit to the secondary storage location.

14. The system of claim 13, wherein the operations further comprise:
selecting, by the adaptor logic, a path comprising the selected port on the owner primary cluster and one active port on one of the secondary clusters in response to determining that there is not at least one active port on the owner secondary cluster.

15. The system of claim 13, wherein the operations further comprise:
selecting, by the adaptor logic, a path comprising one active port on one of the primary clusters and the selected port on the owner secondary cluster in response to determining that there is not at least one active port on the owner primary cluster.

16. The system of claim 13, wherein the storage management software when further executed performs forwarding the copy request and indication of the selected port on one of the primary clusters to the adaptor logic in the primary network adaptor including the selected port;
wherein the adaptor logic when further executed performs:
receiving the copy request and the indication of the selected port on the owner primary cluster; and
transmitting the data for the copy request on a path comprising the selected ports on the primary and secondary clusters including the selected ports.

* * * * *